United States Patent [19]

Smart

[11] Patent Number: 4,992,812
[45] Date of Patent: Feb. 12, 1991

[54] PHOTOGRAPHIC CAMERA WITH FILM THREADING APPARATUS

[75] Inventor: David C. Smart, Rochester, N.Y.

[73] Assignee: Eastman Kodak Company, Rochester, N.Y.

[21] Appl. No.: 379,744

[22] Filed: Jul. 14, 1989

[51] Int. Cl.⁵ .......................... G03B 1/44; G03B 1/50
[52] U.S. Cl. .................................... 354/203; 354/212
[58] Field of Search .................. 354/212, 275, 203; 352/224, 228

[56] References Cited

U.S. PATENT DOCUMENTS

| 1,260,357 | 3/1918 | Folmer . | |
|---|---|---|---|
| 1,966,684 | 7/1934 | Pollock | 352/224 |
| 2,336,278 | 12/1943 | Mihalyi | 354/214 X |
| 2,981,146 | 4/1961 | Kipping | 352/228 |
| 3,479,938 | 11/1969 | Winkler et al. | 354/212 |
| 4,132,473 | 1/1979 | Kondo | 354/203 |
| 4,324,476 | 4/1982 | Seeley | 354/288 |

FOREIGN PATENT DOCUMENTS 38-25934  12/1963  Japan .................................. 354/203

Primary Examiner—A. A. Mathews
Attorney, Agent, or Firm—Roger A. Fields

[57] ABSTRACT

In a camera adapted for use with a film cassette containing a non-protruding film leader which can be automatically propelled out of the cassette, a plurality of film guide members are located along opposite sides of a film advance path leading from a receiving chamber for the cassette to a film take-up means. The guide members are movable closer together to transversely bow the film leader to thereby increase the longitudinal stiffness of the leader to facilitate its being propelled along the film advance path without being snagged. When the film leader is secured to the film take-up means, the guide members are moved slightly apart to permit a film pressure plate to flatten successive imaging areas of the filmstrip over an exposure opening in the film advance path.

7 Claims, 11 Drawing Sheets

4,992,812

PHOTOGRAPHIC CAMERA WITH FILM THREADING APPARATUS

CROSS-REFERENCE TO RELATED APPLICATIONS

Reference is made to the following commonly assigned copending applications: application Ser. No. 221,995, entitled MOTOR-DRIVEN FILM TRANSPORT APPARATUS, and filed July 20, 1988, in the name of Donald M. Harvey, now U.S. Pat. No. 4,855,773; application Ser. No. 07/379,748, entitled CONTROL APPARATUS FOR FILM PRESSURE PLATE IN CAMERAS, and filed July 14, 1989 in the name of David E. Beach; and application Ser. No. 07/379,752, entitled FILM THREADING APPARATUS, and filed July 14, 1989, in the name of David C. Smart.

BACKGROUND OF THE INVENTION

1. Field of the Invention

The invention relates generally to the field of photography, and particularly to a film threading apparatus in a photographic camera.

2. Description of the Prior Art

In conventional 35 mm film manufacturers' cassettes, such as manufactured by Eastman Kodak Company and Fuji Photo Film Co. Ltd., the filmstrip is wound on a flanged spool which is rotatably supported within a cylindrical shell. A leading portion of the filmstrip approximately 2½ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Consequently, rotation of the spool in the unwinding direction cannot serve to advance the filmstrip out of the shell, and it is necessary in the typical 35 mm camera to wind the protruding leader portion onto a film take-up drum in order to draw the filmstrip out of the shell. Since the protruding leader portion is usually laid over the exPosure (back frame) opening in the camera during film loading, it is not uncommon to retract the film pressure plate (for holding each successive film frame flat at the exposure opening) preparatory to winding the leader portion onto the take-up drum. See U.S. Pat. Nos. 4,525,051; 4,505,562; 3,563,144; 2,753,777; and 2,336,279.

A 35 mm film cassette has been proposed which, unlike conventional film cassettes, can be operated to automatically advance the filmstrip out of the cassette shell by rotating the film spool in the unwinding direction. The leader portion normally does not protrude from the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the leading end of the filmstrip is slightly tapered along one longitudinal edge purportedly to allow it to freely extend from between the circumferential lips and rest against the shell wall. During initial unwinding rotation of the film spool, the leading end of the filmstrip is advanced along the shell wall until it reaches an entry to a film passageway in the cassette shell. Then, it is advanced into and through the film passageway to the outside of the cassette shell. The passageway has a width that is slightly less than the width of the filmstrip, thus resulting in the filmstrip being transversely bowed as it is uncoiled from the film spool, and thereby facilitating movement of the film edges under the circumferential lips of the respective flanges.

While the film cassette disclosed in U.S. Pat. No. 4,423,943 includes a non-protruding film leader which is automatically advanced to the outside of the cassette shell when the film spool is rotated in the unwinding direction, the film cassette is intended to be loaded in a camera only after the film leader is advanced to protrude from the cassette shell. In the patent, it is suggested that one manually rotate the film spool relative to the cassette shell until the leader portion can be manually grasped and attached to a film advancing device in the camera.

THE CROSS-REFERENCED APPLICATIONS

Cross-referenced application Ser. No. 221,995 discloses a film cassette in which a film spool can be rotated to unwind a filmstrip off the spool to automatically thrust a non-protruding leader portion of the filmstrip out of the cassette. The ability of the cassette to thrust the leader portion outwardly enables the leader portion to be propelled in a camera from the cassette to a take-up spool. A film transport apparatus of the camera includes a bi-directional drive member having respective positions for effecting alternate one-way driving connections with the film spool of the cassette to rotate the spool in unwinding and rewinding directions in accordance with the rotational direction of a single bi-directional drive motor. During advance of the leader portion from the cassette to the take-up spool of the camera, the take-up spool is motor-driven at a faster speed than the film spool of the cassette is rotated. When the leader portion is wound onto the take-up spool, the drive member permits the film spool to be overdriven by the resulting pull of the filmstrip exerted at the film spool. During rewinding of the filmstrip onto the film spool, the take-up spool is uncoupled from the drive motor to allow the film spool to serve as the only means for film movement.

Cross-referenced application Ser. No. 07/379,748 discloses a camera similarly adapted for use with a film cassette in which a film spool is rotatable to unwind a filmstrip off the spool to automatically thrust a non-protruding leader portion of the filmstrip from the cassette to enable the leader portion to be propelled in the camera over an exposure opening and to a film take-up means. The filmstrip including the leader portion has a natural tendency to curve slightly crosswise. In the camera, a pressure plate is resiliently biased to an operative position for pressing the filmstrip flat at the exposure opening. A restraining device is operated to hold the pressure plate in a retracted position removed from the exposure opening. This permits the filmstrip to assume its natural cross-curvature in order to significantly increase the longitudinal strength of the leader portion to facilitate its being propelled over the exposure opening and to the film take-up means responsive to unwinding rotation of the film spool. When the filmstrip is taken up at the take-up means, the restraining device releases the pressure plate for movement to its operative position.

Cross-referenced application Ser. No. 07/379,752 discloses a camera likewise adapted for use with a film cassette containing a non-protruding film leader which can be automatically propelled out of the cassette. In the camera, a pair of film guide members are fixed along opposite sides of a film threading path leading from a receiving chamber for the cassette. The film leader is wider than the substantial remainder of the filmstrip, and the film guide members are spaced apart a predetermined distance which is slightly less than the leader and slightly greater than the remaining length of the filmstrip, to cause the leader to be transversely bowed as it is propelled between the fixed guide members. Since the film leader is transversely bowed, it becomes longitudinally stiffened to prevent it from being snagged along the film threading path.

SUMMARY OF THE INVENTION

According to the invention, there is provided a camera adapted to be used with a film cassette including a film spool rotatable to unwind a filmstrip off the spool to thrust a non-protruding leader portion of the filmstrip out of the cassette to enable the leader portion to be propelled in the camera along a film advance path between a cassette-receiving chamber and film take-up means, wherein the improvement comprises:

film bowing means including a pair of film guide members located along oPposite sides of the film advance path for transversely bowing the leader portion to thereby significantly increase the longitudinal stiffness of the leader portion to facilitate its being propelled along the film advance path responsive to unwinding rotation of the film spool. Preferably, the film guide members are supported for relative movement to a bowing position in which they are moved closer together to transversely bow the leader portion and for relative movement to a guiding position in which they are moved apart to relieve the filmstrip. Change-over means moves the film guide members from their bowing position to their guiding position responsive to the leader portion being taken up at the film take-up means.

The camera can include a film pressure plate supported for movement to an operative position for holding successive imaging areas of the filmstrip flat over an exposure opening in the film advance path and for movement to a retracted position sufficiently spaced from the film advance path to permit the leader portion to be transversely bowed by the film guide members. In this instance, the change-over means would couple the film pressure plate and the film guide members for substantially simultaneously moving the film pressure plate from its retracted position to its operative position and the film guide members from their bowing position to their guiding position and for substantially simultaneously moving the film pressure plate from its operative position to its retracted position and the film guide members from their guiding position to their bowing position.

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

THE FILM CASSETTE

Figure 1:
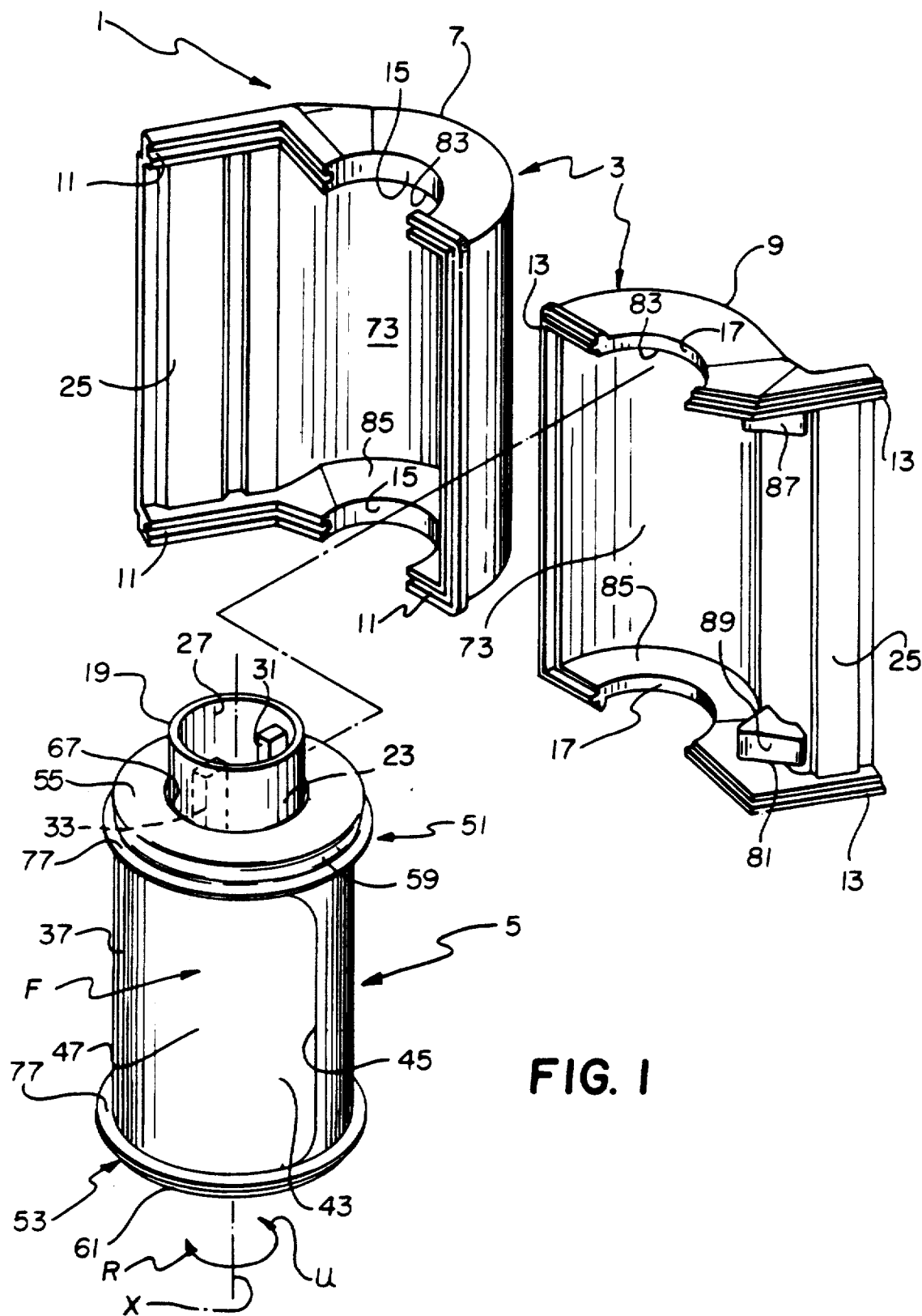
FIG. 1 is an exploded perspective view of a film cassette having a non-protruding film leader, as disclosed in cross-referenced application Ser. No. 221,995.
Figure 2:
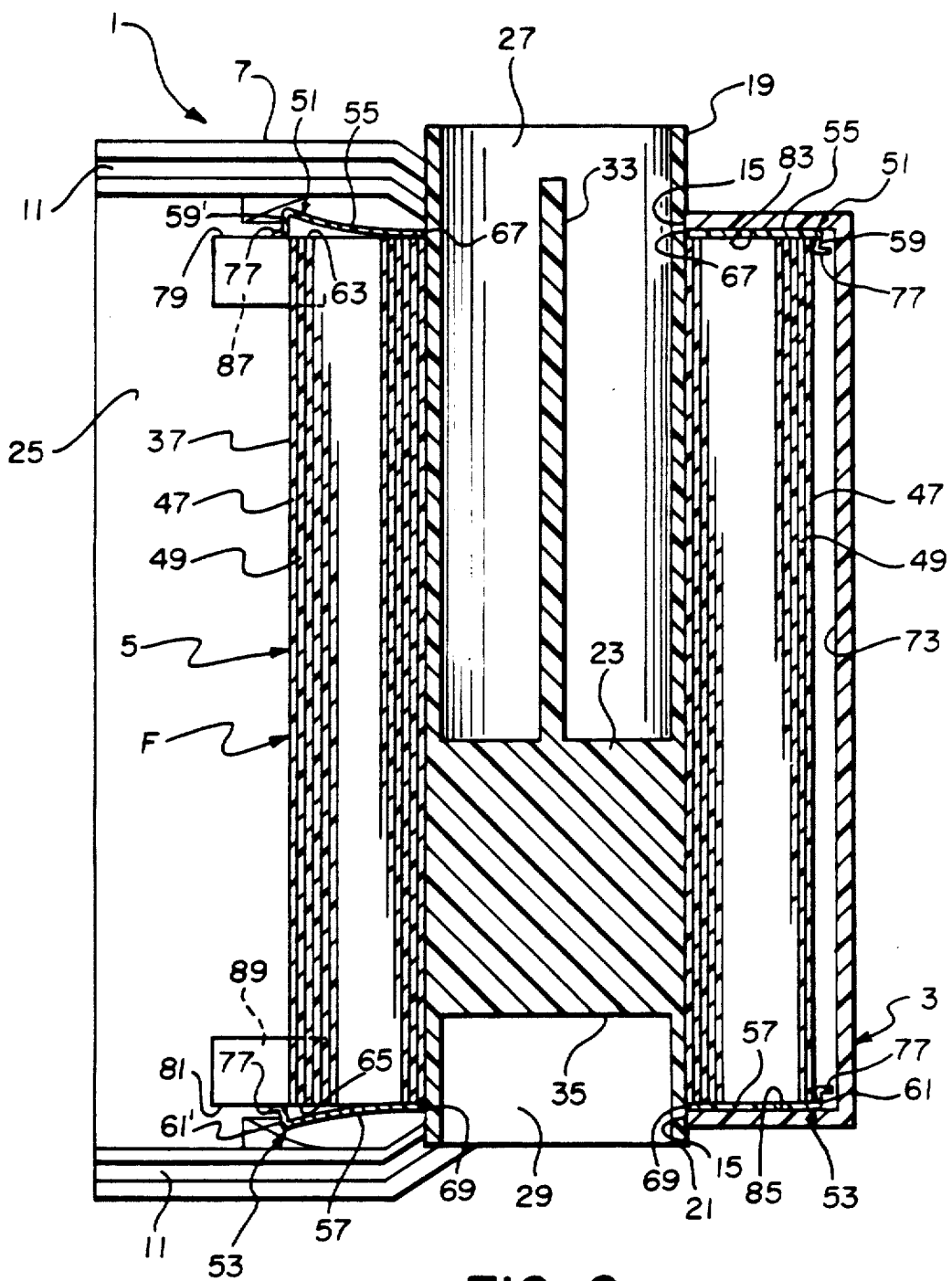
FIG. 2 is an elevation view in cross-section of the film cassette.
Figure 3:
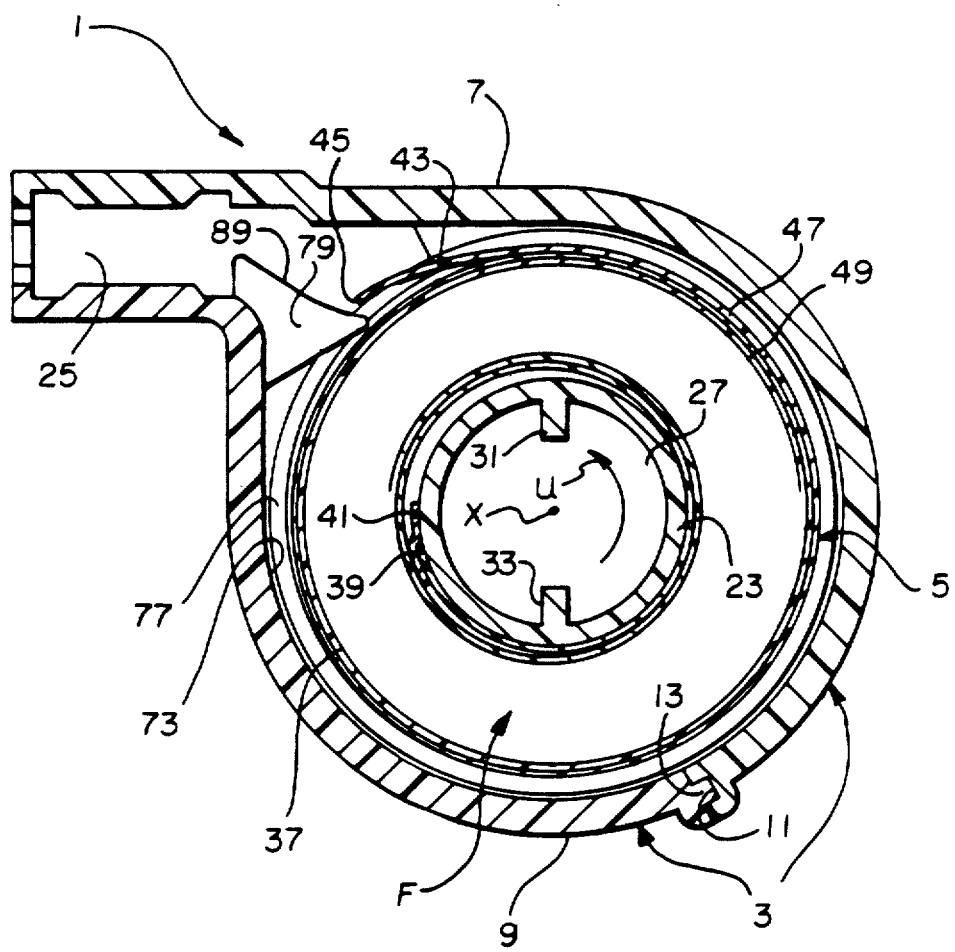
FIG. 3 is an end view in cross-section of the film cassette.

Referring now to the drawings, FIGS. 1-3 depict a 35 mm film cassette 1 generally as disclosed in cross-referenced application Ser. No. 221,995.

Specifically, the film cassette 1 comprises a light-tight cassette shell 3 and a film spool 5 which is rotatable about an axis X within the cassette shell. The cassette shell 3 consists of two shell halves 7 and 9 which are mated along respective groove and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a rewinding direction R opposite to the unwinding direction.

A film roll 37 comprising a convoluted 35 mm filmstrip F having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has a leading or forward end 45 and comprises 2-3 convolutions of the film roll 37. One of these leader convolutions is the outermost convolution 47 and another of them is the next inward succeeding convolution 49.

Figure 4:
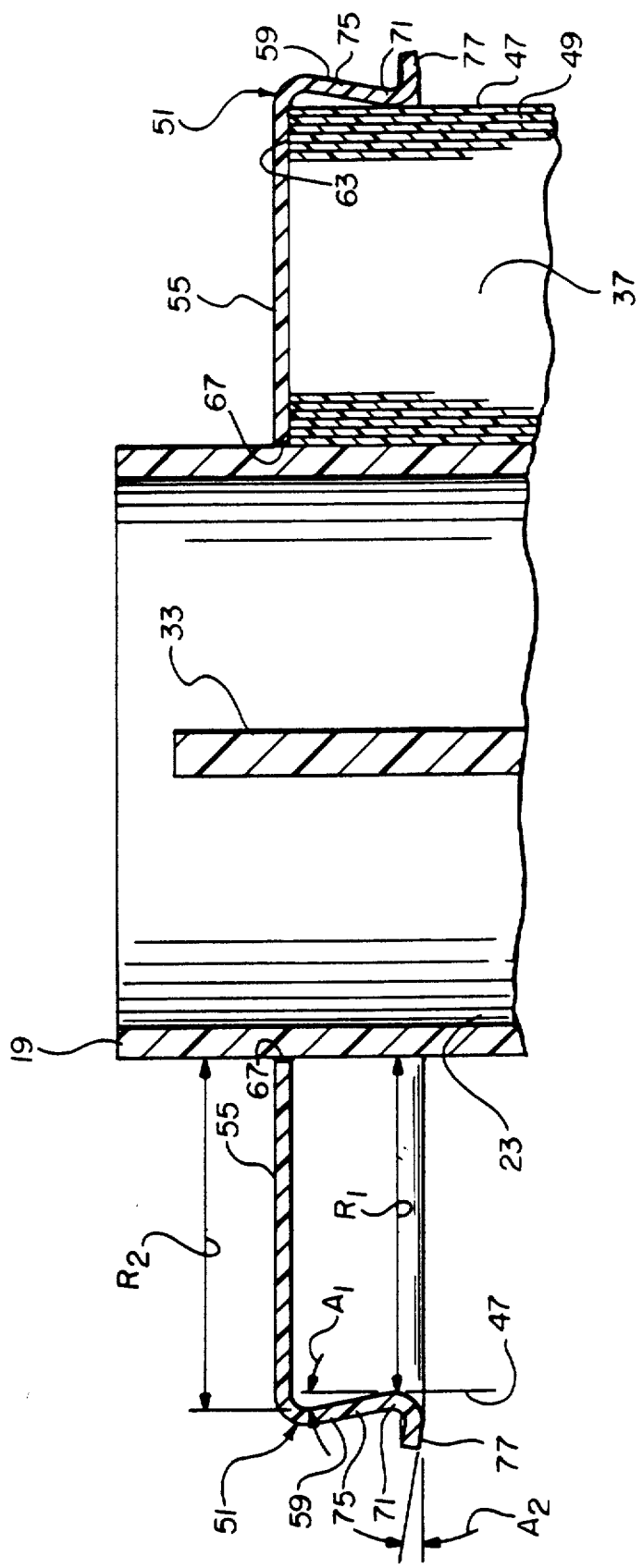
FIG. 4 is an elevation view in cross-section of one of a pair of flanges associated with a film spool within the cassette shell.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 4 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47. The annular relief section 75 of each of the lips 59 and 61 is inclined radially inwardly from one of the disks 55 and 57 toward the outermost convolution 47 to form an acute relief angle $A_1$ with the outer most convolution. See FIG. 4. The relief angle $A_1$ may be 11°45′, for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upwardly as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 25 as shown in FIG. 2. The respective spreader surfaces 79 and 81 deflect opposite limited portions 59′ and 61′ of the annular lips 59 and 61 axially away from each other to an axial dimension slightly exceeding the film width. See FIG. 2. In essence, the deflected portions 59′ and 61′ of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semicircular flat surfaces 83 and 85 of the cassette shell 3. The flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59′ and 61′ of the two lips, bears against the respective spreader surfaces 79 and 81. Since the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips is useful during assembly of the film cassette 1 to position either of the spreader surfaces 79 and 81 relative to an annular free end section.

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges. Then, rotation of the spool core 23 in the same direction will similarly rotate the two flanges 51 and 53. As a result, the two spreader surfaces 79 and 81 will deflect successive portions 59′ and 61′ of the annular lips 59 and 61 axially away from each other as the respective portions are rotated past the spreader surfaces. The deflected portions 59′ and 61′ of the two lips 59 and 61 are returned to their original non-flexed condition by the semicircular flat surfaces 83 and 85 of the cassette shell 3. As can be appreciated from FIG. 3, the leading end 45 of the film roll 37 will be freed from the radial confinement of the two lips 59 and 61 in the vicinity of the two spreader surfaces 79 and 81, and it will be advanced against a pair of rigid identical stripper-guide surfaces 87 and 89 integrally formed with the respective spreader surfaces. The two stripper-guide surfaces 87 and 89 operate to direct the leading end 45 into the film passage slit 25, thereby allowing succeeding portions of the outermost convolution 47 to be freed from corresponding portions of the two lips 59 and 61 as those portions of the lips are deflected by the two spreader surfaces 79 and 81. Consequently, continued rotation of the spool core 23 will thrust the film leader 43 from the inside to the outside of the cassette shell 3.

When the spool core 23 is rotated in the rewinding direction R opposite to the unwinding direction U, the filmstrip will be wound back onto the spool core since the trailing end 39 of the filmstrip is attached to the spool core. Other aspects of this portion of operation of the film cassette 1 are substantially similar to the portion of operation when the spool core 23 is rotated in the unwinding direction U.

THE PHOTOGRAPHIC CAMERA - FILM TRANSPORT APPARATUS

Figure 5:
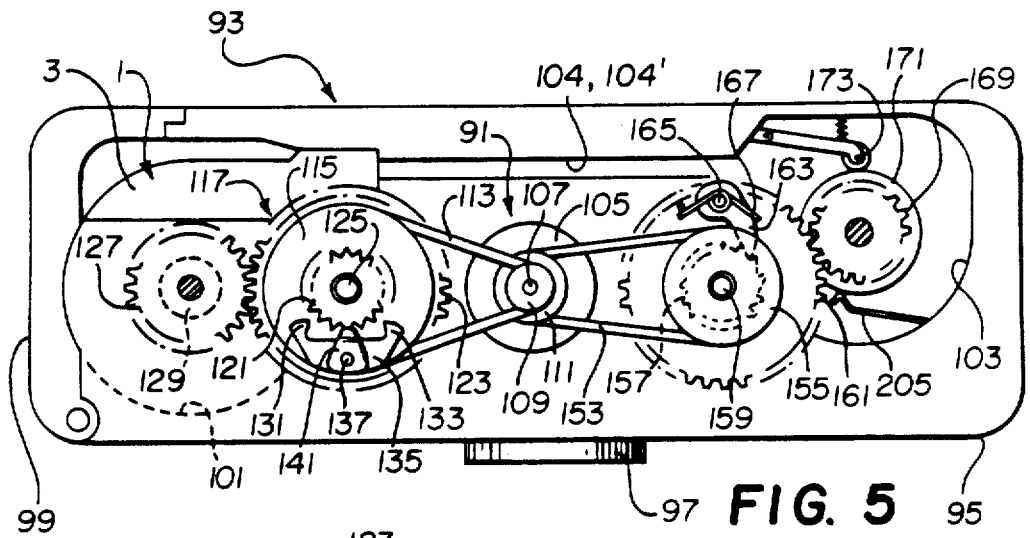
FIG. 5 is a bottom plan view of motor-driven film transport apparatus in a photographic camera to be used with the film cassette depicted in FIGS. 1-4, as disclosed in the cross-referenced application.
Figure 6:
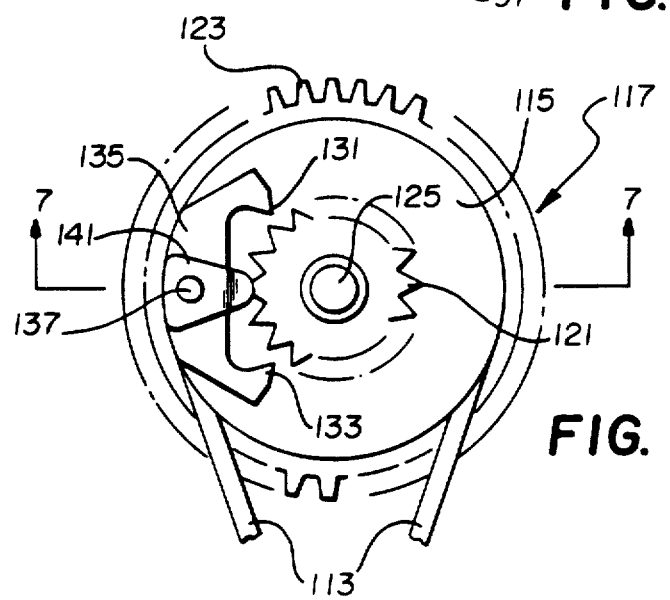
FIG. 6 is a bottom plan view of a bi-directional film drive mechanism of the film transport apparatus.
Figure 7:
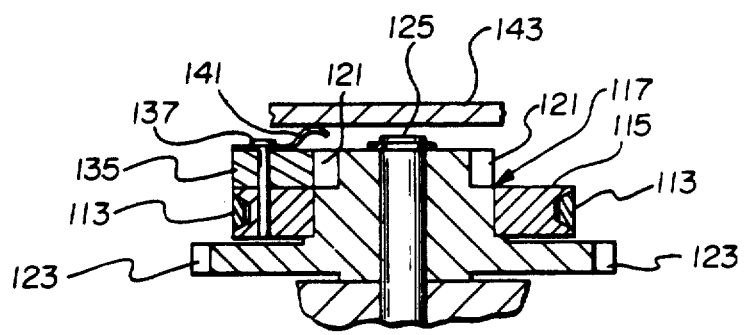
FIG. 7 is a cross-sectional view of the bi-directional film drive mechanism as viewed in the direction of the arrows 7, 7 in FIG. 6.

Referring now to FIGS. 5-7, a motor-driven film transport apparatus 91 for a photographic camera 93 is depicted for use with the film cassette 1. The camera body 95 is shown with a front lens shield 97, a loading door 99 opening to a cassette-receiving chamber 101, a separate film take-up chamber 103, and a film guide channel 104 interconnecting the two chambers to define a film advance path 104' from one chamber to the other one. A conventional bi-directional drive motor 105 which can change its rotational direction by switching the current flow direction to the motor, includes a drive shaft 107. A pair of smaller and larger radius drive pulleys 109 and 111 are coaxially fixed to the drive shaft 107. The smaller drive pulleY 109 is drivingly connected via an endless belt 113 to a driven pulley 115, concentrically disposed loosely about a multiple gear unit 117. The multiple gear unit 117 has a smaller circular gear portion 121 and a larger circular gear portion 123, and is mounted for rotation on an idler shaft 125. The larger circular gear portion 123 of the multiple gear unit 117 is arranged to continually engage a gear wheel 127 having an integral coaxial rotation hub 129 which projects from the bottom of the cassette-receiving chamber 101 to engage the two keying ribs 31 and 33 formed with the spool core 23 of the film cassette 1. The smaller circular gear portion 121 of the multiple gear unit 117 is intended to be drivingly engaged by either one of a pair of separate pawl ends 131 and 133 of a bi-directional drive member 135. The drive member 135 is mounted atop the driven pulley 115 via a pivot pin 137, disposed parallel to the idler shaft 125. When the multiple gear unit 117 is rotated in a counter-clockwise direction 139 about the idler shaft 125 a viewed in FIG. 8, a thin leaf spring 141 fixed to the drive member 135 at the pivot pin 137 will drag along a plate-like section 143 of the camera body 95 to swing the drive member about the pivot pin until its pawl end 133 drivingly engages the smaller circular gear portion 121 of the multiple gear unit. See FIGS. 7 and 8. Conversely, when the multiple gear unit 117 is rotated in a clockwise direction 145 about the idler shaft 125 as viewed in FIG. 10, the leaf spring 141 will drag along the plate-like section 143 to swing the drive member 135 about the pivot pin 137 until its pawl end 131 drivingly engages the smaller circular gear portion 121 of the multiple gear unit. Thus, energization of the drive motor 105 with a current flow direction to rotate the smaller drive pulley 109 in a counter-clockwise direction 139' as viewed in FIG. 8, will swing the drive member 135 to position its pawl end 133 in driving engagement with the smaller circular gear portion 121 to in turn rotate the larger circular gear portion 123 in the counter-clockwise direction 139, and thereby will rotate the gear wheel 127 in a clockwise direction 147 to in turn rotate the spool core 23 of the film cassette 1 in the unwinding direction U to thrust the non-protruding film leader 43 from the film cassette (as described in detail above) into the film guide channel 104. Energization of the drive motor 105 with a current flow direction to rotate the smaller drive pulley 109 in a clockwise direction 145' as viewed in FIG. 10, will swing the drive member 135 to position its pawl end 131 in driving engagement with the smaller circular gear portion 121 to in turn rotate the larger circular gear portion 123 in the clockwise direction 145, and thereby will rotate the gear wheel 127 in a counter-clockwise direction 151 to in turn rotate the spool core 23 of the film cassette 1 in the rewinding direction R to return the film leader 43 to the film cassette.

The larger drive pulley 111 is drivingly connected via an endless belt 153 to a driven pulley 155 which, with an integral circular gear portion 157, is mounted for rotation on an idler shaft 159. A gear wheel 161 is concentrically disposed loosely about the idler shaft 159, and is normally coupled to the pulley gear portion 157 by a pawl member 163 for concurrent rotation with the driven pulley 155 in the counter-clockwise direction 139" as viewed in FIG. 8. The pawl member 163 is mounted atop the gear wheel 161 via a pivot pin 165, disposed parallel to the idler shaft 159, and is urged by a torque spring 167 to releasably engage the pulley gear portion 157. The gear wheel 161 continually engages a gear wheel 169 which is coaxially fixed to a rotatably mounted conventional take-up drum or spool 171 in the take-up chamber 103. Film engagement means, not shown, located on the take-up spool 171, and a spring-urged pressure roller 173 serve to facilitate securing of the film leader 43 automatically in a known manner to the take-up spool. When the drive motor 105 is energized with a current flow direction to rotate the larger drive pulley 111 in the counter-clockwise direction 139' as viewed in FIG. 8, the pulley gear portion 157 will be rotated in the counter-clockwise direction 139" to orbit the pawl member 163 in the same direction to in turn similarly rotate the gear wheel 161, and thereby rotate the gear wheel 169 in a clockwise direction 147' to similarly rotate the take-up spool 171. Due to the gear and pulley ratios, the pulley gear portion 157 will be rotated at a sufficient speed which ensures that the take-up spool 171 will take-up the film leader 43 faster than the spool core 23 of the film cassette 1 can be rotated to thrust the film leader from the film cassette. As a result, the film pull or tension exerted at the spool core 23 because of take up of the film leader 43 at the take-up spool 171 will cause the smaller circular gear portion 121 of the multiple gear unit 117 to be over-driven in the counter-clockwise direction 139, whereupon the smaller circular gear portion will disengage from the pawl end 133 of the bi-directional drive member 135 as shown in FIG. 9 to, in effect, uncouple the drive motor 105 from the spool core 23. When the drive motor 105 is energized with a current flow direction to rotate the larger drive pulley 111 in the clockwise direction 145' as viewed in FIG. 10, the pulley gear portion 157 will be rotated in the clockwise direction 145". However, the pulley gear portion 157 will not orbit the pawl member 163 as in the previous instance, because of the inclination of the gear teeth. See FIG. 10. As a result, the pawl member 163 cannot serve to rotate the gear wheel 161, and the take-up spool 11 will only be rotated in a counter-clockwise direction 151' because of the film pull exerted at the take-up spool as the filmstrip F is rewound onto the spool core 23 of the film cassette 1.

Figure 8:
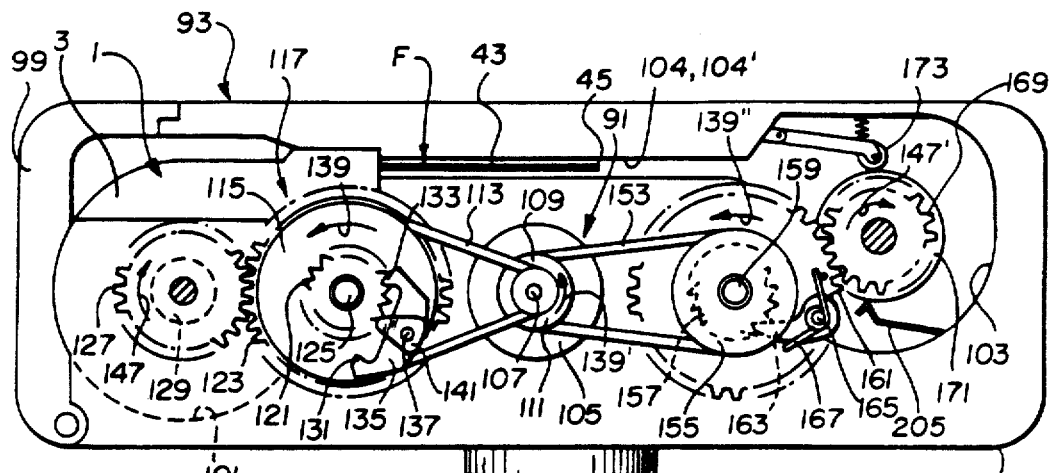
FIGS. 8 and 9 are bottom plan views of the film transport apparatus, showing operation of the bi-directional film drive mechanism in respective modes for rotating the film spool of the film cassette in an unwinding direction and for allowing the spool to be film-driven when the film leader is secured to a take-up spool.
Figure 9:
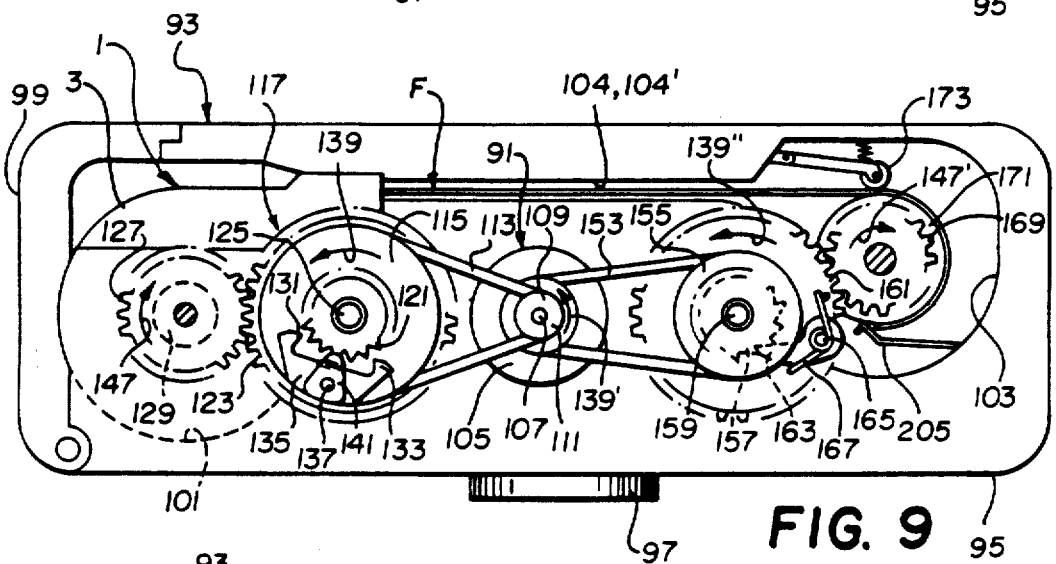
Figure 10:
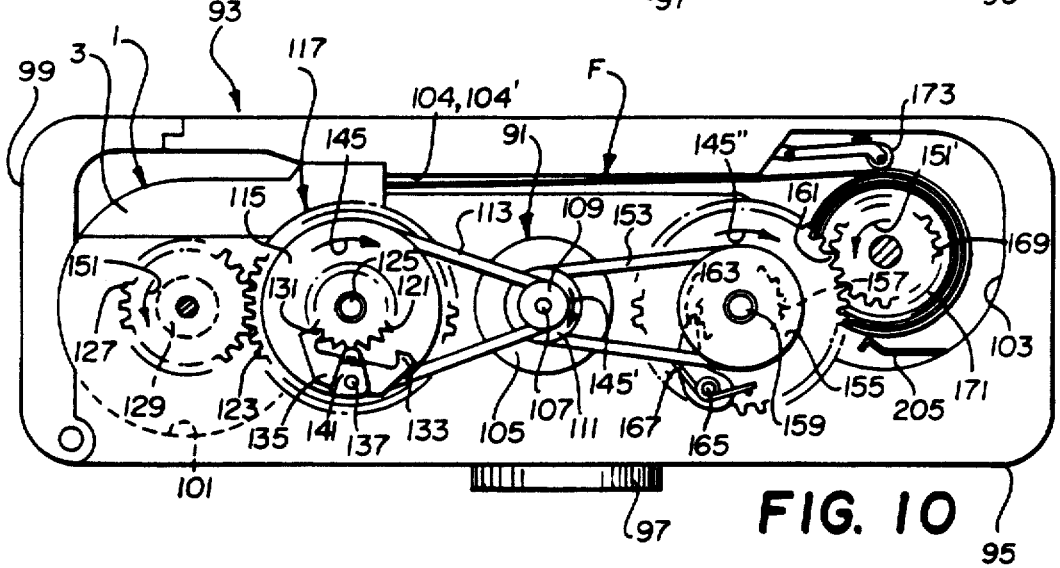
FIG. 10 is a bottom plan view of the film transport apparatus, showing operation of the bi-directional film drive mechanism in a mode for rotating the film spool in a rewinding direction.

It will be appreciated that the bi-directional drive member 135 has respective positions, shown in FIGS. 8 and 10, for effecting alternate one-way driving connections with the spool core 23 to rotate the spool core in the unwinding and rewinding directions U and R in accordance with the rotational direction of the drive motor 105. During advance of the film leader 43 from the film cassette 1 along the film advance path 104' (defined by the film guide channel 104) to the take-up spool 171, the take-up spool is motor-driven at a faster speed than the spool core 23 is rotated. When the film leader 43 is secured to the take-up spool 173, the drive member 135 permits the spool core to be overdriven by the resulting pull of the filmstrip F exerted at the spool core. During rewinding of the filmstrip F along the film advance path 104' back onto the spool core 23, the take-up spool 173 is uncoupled from the drive motor 105 to allow the spool core to serve as the only means for film movement.

THE PHOTOGRAPHIC CAMERA - FILM THREADING APPARATUS

Figure 11:
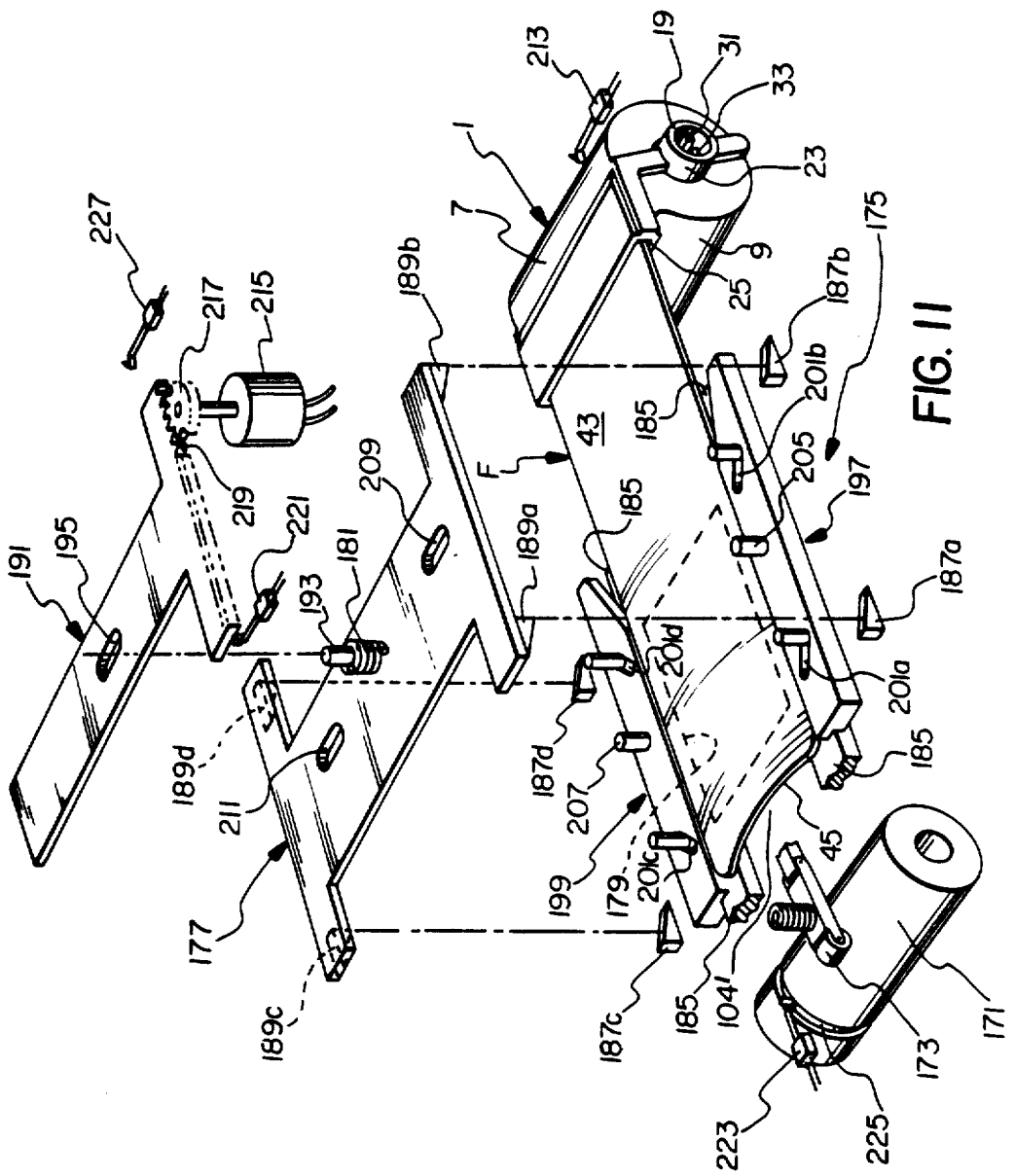
FIG. 11 is an exploded rear perspective view of a camera including film threading apparatus, according to a preferred embodiment of the invention.

Referring now to FIG. 11, a film threading apparatus 175 is shown for assuring that the non-protruding film leader 43 is propelled from the film cassette 1, along the film advance path 104', to the take-up spool 173 responsive to rotation of the spool core 23 of the film cassette in the unwinding direction U.

A film pressure plate 177 is supported for movement between an operative position, shown in FIGS. 14 and 15, for holding successive imaging areas of the filmstrip F flat over an exposure (back frame) opening 179 in the film advance path 104', and a retracted position, shown in FIGS. 11, 12, and 13, sufficiently spaced from the advance path to permit the film leader 43 to be transversely bowed by film bowing means to be described below. In its operative position, the film pressure plate 177 is urged via a helical compression spring 181 against a typical pair of plate support ridges 183 to press the respective longitudinal edges of successive imaging areas of the filmstrip F flat against a typical pair of film support rails 185. In its retracted position, the pressure plate 177 is separated from the ridges 183, although the film edges continue to rest against the rails 185. Four ramps 187a, 187b, 187c, and 187d fixed to the camera body 95 cooperate with respective ramps 189a, 189b, 189c, and 189d fixed to the pressure plate 177 to move the pressure plate between its operative and retracted positions. To move the pressure plate 177 from its retracted position to its operative position, a control slide 191 supported for sliding movement by known means, not shown, is moved to the right in FIGS. 11 and 12. Since the pressure plate 177 has an integral post 193 which extends through an elongate opening 195 in the control slide 191, the four ramps 189a-189d of the pressure plate will be urged downward along the corresponding ramps 187a-187d fixed to the camera body 95 to lower the pressure plate onto the plate support ridges 183. See FIG. 15. To move the pressure plate 177 from its operative position to its retracted position, the control slide 191 is moved to the left in FIG. 14. This urges the four ramps 189a-189d upward along the corresponding ramps 187a-187d to raise the pressure plate 177 from the plate support ridges 183. See FIG. 13.

As shown in FIG. 11, a pair of film guide members 197 and 199 are located along opposite sides of the film advance path 104' to lie adjacent corresponding longitudinal edges of the exposure opening 179. The two guide members 197 and 199 are supported for movement closer together (towards each other) to a film bowing position, shown in FIGS. 11-13, for transversely bowing the film leader 43 to thereby significantly increase its longitudinal stiffness to facilitate its being propelled along the film advance path from the film cassette 1 to the take-up spool 171, and for movement slightly apart (away from each other) to a film guiding position, shown in FIGS. 14 and 15, for guiding the filmstrip F along the film advance path after the film leader has been secured to the take-up spool 173. Four cam pins 201a, 201b, 201c, and 201d fixed to the camera body 95 extend through respective inclined slots 203a, 203b, 203c, and 203d in the two guide members 197 and 199 to support the guide members for movement between their film bowing and film guiding positions. To move the two guide members 197 and 199 slightly apart from their film bowing position to their film guiding position, the control slide 191 is moved to the right in FIGS. 11 and 12. Since the two guide members 197 and 199 have respective posts 205 and 207 which extend through elongate openings 209 and 211 in the film pressure plate 177, the guide members will be moved apart to their film guiding position responsive to the pressure plate being lowered along the four ramps 187a-187d to its operative position. See FIG. 15. To move the two guide members 197 and 199 closer together from their film guiding position to their film bowing position, the control slide 191 is moved to the left in FIG. 14. This raises the pressure plate 177 along the four ramps 187a-187d to its retracted position to in turn move the two guide members 197 and 199 to their film bowing position. See FIG. 13.

Figure 12:
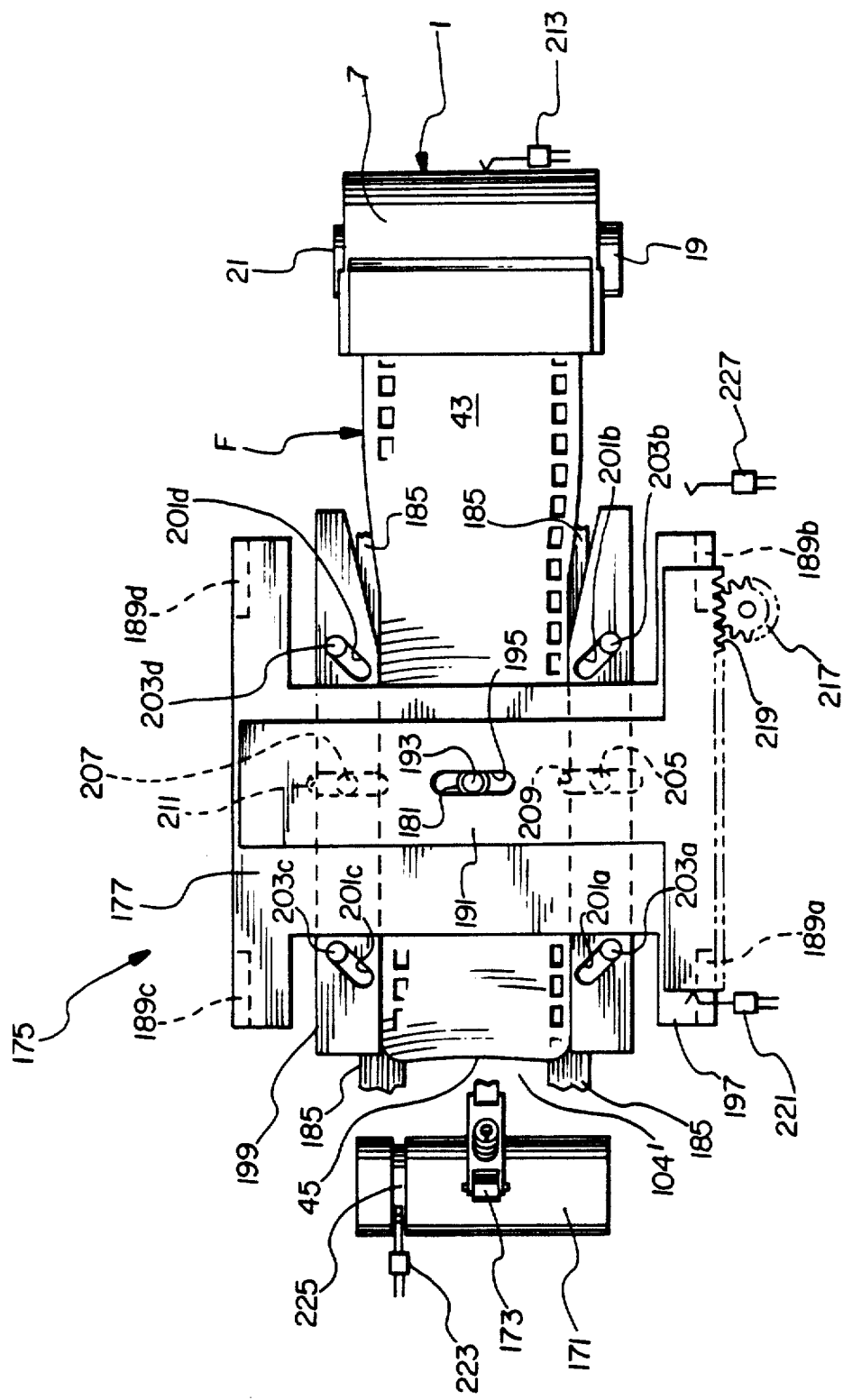
FIG. 12 is an elevation view of the film threading apparatus depicted in FIG. 11, showing a film pressure plate in a retracted position and a pair of film guide members in a film bowing position.
Figure 13:
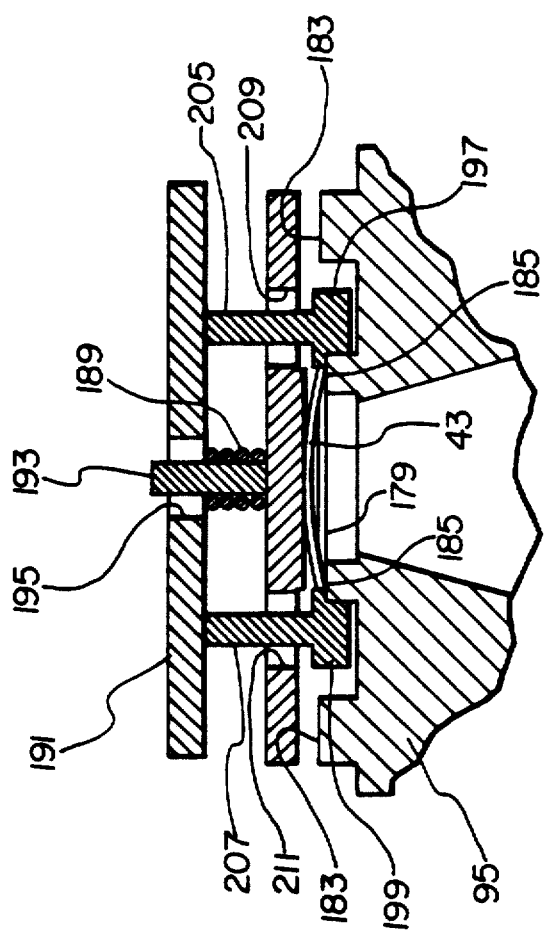
FIG. 13 is a cross-sectional view of the film threading apparatus depicted in FIG. 12.
Figure 14:
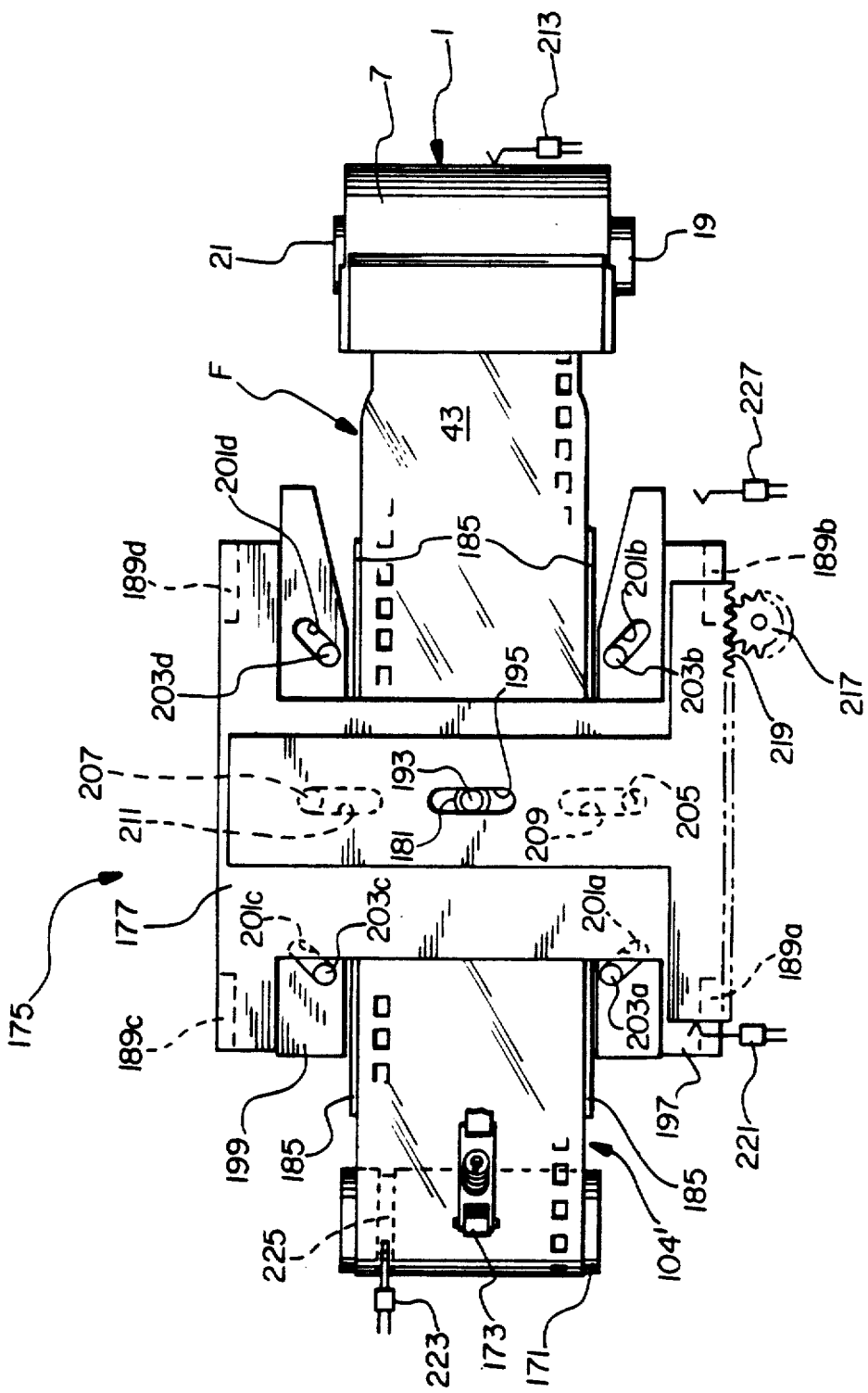
FIG. 14 is an elevation view similar to FIG. 12, showing the film pressure plate in an operative position and the film guide members in a film guiding position.
Figure 15:
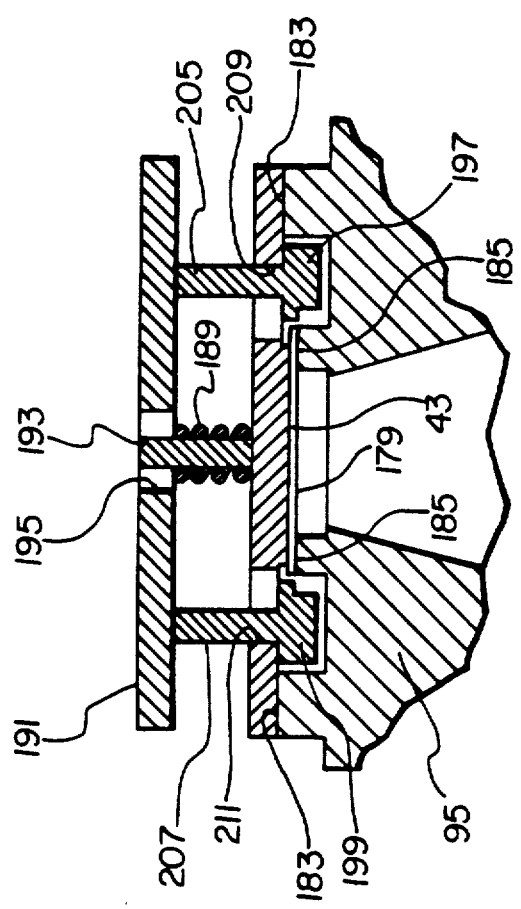
FIG. 15 is a cross-sectional view corresponding to FIG. 14.

Known means may be used to move the control slide 191 to the left in FIG. 14 and to the right in FIGS. 11 and 12. For example, to move the control slide 191 to the left in FIG. 14, a cassette presence sensor switch 213 is closed by the presence of the film cassette 1 in the cassette-receiving chamber 101 of the camera body 95 to energize a bi-direction motor 215 in a forward mode to thereby rotate a pinion 217 counter-clockwise in FIG. 14. Since the pinion 217 is arranged in continuous engagement with an integral rack 219 along one edge of the control slide 191, the control slide will be driven to the left in FIG. 14. A limit switch 221 is positioned in the path of movement of the control slide 191 to de-energize the motor 215 at the appropriate time, i.e. when the film guide members 197 and 199 are moved to their film bowing position and the film pressure plate 171 is moved to its retracted position. See FIG. 12. To move the control slide 191 to the right in FIGS. 11 and 12, a leader presence sensor switch 223 normally located within an annular groove 225 in the take-up spool 171 is closed by winding of a first convolution of the film leader 43 onto the take-up spool. The closed switch 223 energizes the motor 215 in a reverse mode to thereby rotate the pinion 217 clockwise in FIGS. 11 and 12 to drive the control slide 191 to the right. A limit switch 227 is positioned in the path of movement of the control slide 191 to de-energize the motor 215 at the appropriate time, i.e. when the guide members 197 and 199 are moved to their film guiding position and the pressure plate 171 is moved to its operative position. See FIG. 14.

The invention has been described with reference to a preferred embodiment. However, it will be appreciated that variations and modifications can be effected with the ordinary skill in the art without departing from the scope of the invention.

I claim:

1. An improved camera adapted to be used with a film cassette including a film spool rotatable to unwind a filmstrip off the spool to thrust a non-protruding leader portion of the filmstrip out of the cassette to enable the leader portion to be propelled in said camera forward along a film advance path from a cassette-receiving chamber, wherein the improvement comprises:

film bowing means including a pair of film guide members located along opposite sides of the film advance path for transversely bowing the leader portion to increase the longitudinal stiffness of the leader portion to facilitate its being propelled forward along the film advance path responsive to unwinding rotation of the film spool, said film guide members being supported for relative movement to a bowing position in which they are moved closer together to transversely bow the leader portion and for relative movement to a guiding position in which they are moved apart to relieve the filmstrip; and change-over means for moving said film guide members from their bowing position to their guiding position only after at least a forward-most part of the leader portion is propelled clear of the film guide members.

2. The improvement as recited in claim 1, wherein said camera has film take-up means spaced from said cassette-receiving chamber with the film advance path located between said film take-up means and the cassette-receiving chamber, and said change-over means includes integral means for moving said film guide members from their bowing position to their guiding position responsive to the leader portion being taken up at said film take-up means.

3. The improvement as recited in claim 2, wherein said camera includes a film pressure plate supported for movement to an operative position for holding successive imaging areas of the filmstrip flat over an exposure opening in the film advance path and for movement to a retracted position sufficiently spaced from the film advance path to permit the leader portion to be transversely bowed by said film guide members.

4. The improvement as recited in claim 3, wherein said change-over means includes integral means for substantially simultaneously moving said film pressure plate from its retracted position to its operative position and said film guide members from their bowing position to their guiding position.

5. The improvement as recited in claim 4, wherein said change-over means includes a film presence sensor for enabling the change-over means to move said film pressure plate from its retracted position to its operative position and said film guide members from their bowing position to their guiding position responsive to the leader portion being taken up at said film take-up means.

6. The improvement as recited in claim 3, wherein said change-over means includes integral means coupling said film pressure plate and said film guide members for substantially simultaneously moving the film pressure plate from its retracted position to its operative position and the film guide members from their bowing position to their guiding position and for substantially simultaneously moving the film pressure plate from its operative position to its retracted position and the film guide members from their guiding position to their bowing position.

7. An improved camera adapted to be used with a film cassette including a filmstrip having a leader portion that can be propelled in said camera along a film advance path between a cassette-receiving chamber and film take-up means, wherein the improvement comprises:

film bowing means including a pair of film guide members located along opposite sides of the film advance path for transversely bowing the leader portion to increase the longitudinal stiffness of the leader portion to facilitate its being propelled along the film advance path; and change-over means for moving said film guide members from a bowing position for transversely bowing the leader portion to a guiding position in which they are moved apart to relieve the filmstrip, responsive to the leader portion being take up at said film take-up means.

* * * * *